United States Patent
de Oliveira et al.

(10) Patent No.: US 9,112,851 B2
(45) Date of Patent: Aug. 18, 2015

(54) INTEGRATING WEB PROTOCOLS WITH APPLICATIONS AND SERVICES

(71) Applicants: Anderson Santana de Oliveira, Antibes (FR); Jakub Sendor, Nice (FR); Gabriel Serme, Montfavet (FR); Yann Lehmann, Colombier (CH)

(72) Inventors: Anderson Santana de Oliveira, Antibes (FR); Jakub Sendor, Nice (FR); Gabriel Serme, Montfavet (FR); Yann Lehmann, Colombier (CH)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 13/920,317

(22) Filed: Jun. 18, 2013

(65) Prior Publication Data

US 2014/0373130 A1    Dec. 18, 2014

(51) Int. Cl.
*H04L 29/06*    (2006.01)
*G06F 21/41*    (2013.01)

(52) U.S. Cl.
CPC ............ *H04L 63/0815* (2013.01); *G06F 21/41* (2013.01); *H04L 63/0227* (2013.01); *H04L 63/168* (2013.01)

(58) Field of Classification Search
CPC .................................................. H04L 63/0815
USPC ........................................................... 726/14
See application file for complete search history.

(56) References Cited

U.S. PATENT DOCUMENTS

| | | | |
|---|---|---|---|
| 5,872,915 A | 2/1999 | Dykes et al. | |
| 7,487,513 B1 | 2/2009 | Savchenko et al. | |
| 7,559,080 B2 | 7/2009 | Bhargavan et al. | |
| 7,565,536 B2 | 7/2009 | Sachdeva et al. | |
| 7,962,470 B2 | 6/2011 | Degenkolb et al. | |
| 8,402,520 B1 | 3/2013 | Painter et al. | |
| 8,701,180 B2 | 4/2014 | Jolfaei | |
| 2003/0037236 A1 | 2/2003 | Simon et al. | |
| 2005/0125677 A1 | 6/2005 | Michaelides | |
| 2005/0268326 A1 | 12/2005 | Bhargavan et al. | |
| 2009/0006539 A1 | 1/2009 | Degenkolb et al. | |
| 2011/0154051 A1* | 6/2011 | Larson et al. | 713/189 |
| 2011/0231921 A1 | 9/2011 | Narayanan et al. | |
| 2011/0307940 A1 | 12/2011 | Wong | |
| 2012/0028609 A1* | 2/2012 | Hruska | 455/411 |
| 2012/0198511 A1 | 8/2012 | Sarferaz | |
| 2012/0278453 A1 | 11/2012 | Baum et al. | |

OTHER PUBLICATIONS

Apache Oltu, "Apache Amber," The Apache Software Foundation, Mar. 25, 2013, retrieved on internet at http://incubator.apache.org/amber, 2 pages.

Apache CXF, "Apache CXF: An Open-Source Services Framework," retrieved on internet Jun. 4, 2013 at http://cxf.apache.org, 4 pages.

(Continued)

*Primary Examiner* — Jacob Lipman

(74) *Attorney, Agent, or Firm* — Fish & Richardson P.C.

(57) ABSTRACT

Techniques for integrating a security protocol in an application include receiving a web protocol request generated by the application at an interceptor, the interceptor configured to read and write the web protocol request; receiving a selection of a role comprising one or more validation aspects and a plurality of extended application components; based on reading the web protocol request, retrieving configuration data associated with the web protocol request; adding the plurality of extended application components using the configuration data; and executing the web protocol in the application using the selected role.

20 Claims, 5 Drawing Sheets

(56) References Cited

OTHER PUBLICATIONS

Eclipse, "Eclipse Platform Technical Overview," 2006, retrieved at http://www.eclipse.org/articles/Whitepaper-Platform-3.1/eclipse-platform-whitepaper.html, 18 pages.

Facebook, "Authentication," 2013, retrieved on internet at http://developers.facebook.com/docs/reference/androidsdk/authentication/, 2 pages.

Google Developers, "Using OAuth 2.0 to Access Google APIs," retrieved on internet Jun. 4, 2013 at https://developers.google.com/accounts/docs/OAuth2, 6 pages.

Gordon, "Provable Implementations of Security Protocols," Proceedings of the 21st Annual IEEE Symposium on Logic in Computer Science, 2006, pp. 345-346.

Hammer, et la., "The OAuth 2.0 Authorization Protocol," Mar. 8, 2012, retrieved on internet at http://tools.ietf.org/html/draft-ietf-oauth-v2-25, 66 pages.

Hammer, et la., "The OAuth 1.0 Protocol," Apr. 2010, retrieved on internet at http://tools.ietf.org/html/rfc5849, 38 pages.

Java.net, "Jersey," 2013, retrieved on internet at https://jersey.java.net/ , 2 pages.

Microsoft. (2013), OAuth 2.0, retrieved on internet Jun. 4, 2013, from MSDN: http://msdn.microsoft.com/en-us/library/live/hh243647.aspx, 10 pages.

Pozza, et al., "Spi2Java: automatic Cryptographic Protocol Java code Generation from spi calculus," Advanced Information Networking and Applications, 2004, pp. 400-405.

"Securing Rest Web Services with OAuth," retrieved on internet Jun. 5, 2013 at http://developers.sun.com/identity/reference/techart/restwebservices.html, 2 pages.

Song, et al., "AGVI—Automatic Generation, Verification, and Implementation of Security Protocols," Computer Aided Verification, 2001, 5 pages.

Tobler, et al., "Generating Network Security Protocol Implementations From Formal Specifications," Certification and Security in Inter-Organizational E-Service, IFIP International Federation for Information Processing, 2005, 10 pages.

\* cited by examiner

INTEGRATING WEB PROTOCOLS WITH APPLICATIONS AND SERVICES

TECHNICAL FIELD

The present disclosure relates to software, computer systems, and computer implemented methods for integration of protocols with web applications and services.

BACKGROUND

Web based protocols, in particular security protocols such as OpenId, SAML SSO, and OAuth 2, have a role in the cloud. Web based security protocols include standardized methods that enable users to control the number of accounts, and also to control which services in the cloud should have access to particular private data sets. For example, a user can access a calendar application through a social networking application. The access is enabled by a protocol that establishes a trust relationship between the social networking application and the calendar application, such that the user can authenticate towards the first, in a way that it is recognized by the second. The specific message sequence and the security requirements to protect the confidentiality of messages transmitted are determined by the protocol specification.

In some cases, a web application, a web service or a cloud application developer fails to meet the security requirements. Unsatisfied security requirements generate security vulnerabilities, which can lead to faulty implementations, exploitable by malicious clients, with drastic consequences for the privacy of the end-user and for business data. In some cases, security vulnerabilities are originated from inexperience, lack of knowledge of secure programming practices or incorrect implementation of the security protocol.

SUMMARY

The present disclosure relates to computer-implemented methods, computer-readable media, and computer systems for integrating a security protocol in an application. One computer-implemented method includes receiving a web protocol request generated by the application at an interceptor, the interceptor configured to read and write the web protocol request; receiving a selection of a role comprising one or more validation aspects and a plurality of extended application components; based on reading the web protocol request, retrieving configuration data associated with the web protocol request; adding the plurality of extended application components using the configuration data; and executing the web protocol in the application using the selected role.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

A first aspect combinable with any of the general implementations further includes creating a configuration to run the web protocol in an environment of the application with a plurality of files of the configuration data.

In a second aspect combinable with any of the previous aspects, the plurality of files of the configuration data comprise one or more of a plain text, a structured document, an extensible markup language and an executable code.

A third aspect combinable with any of the previous aspects further includes adding the extended application components to a plurality of core application components without disrupting the plurality of core application components.

In a fourth aspect combinable with any of the previous aspects, a software code of the core application components is not altered.

A fifth aspect combinable with any of the previous aspects further includes connecting the plurality of core application components with the plurality of extended application components using a plug-in.

A sixth aspect combinable with any of the previous aspects further includes presenting, through the plug-in, a request for input from a user during a configuration phase.

In a seventh aspect combinable with any of the previous aspects, the input from the user comprises a user identification data, a role, and an agreement of the user to access a proprietary resource.

An eighth aspect combinable with any of the previous aspects further includes extracting data from the plurality of files to run the web protocol during a runtime.

In a ninth aspect combinable with any of the previous aspects, the configuration comprises a plurality of security keys necessary for the web protocol to operate correctly.

A tenth aspect combinable with any of the previous aspects further includes automatically applying the web protocol to a plurality of endpoints in the web application.

Various implementations of methods for integration of web protocols with web applications and services described in this disclosure can include none, one, some, or all of the following features. The use of interceptors can provide increased flexibility in the incorporation of new web protocols with a given application, while decreasing the time to market for high quality security solutions. In some examples, the program security can be increased with a high degree of automation with minimal effort. Furthermore, implementations of the present disclosure can relieve the developer from having to be familiar with program security. In some examples, the extensibility of the application components can enable developers to create business-specific enhanced data types and corresponding validation aspects. New security functionality can further be integrated modularly without disrupting existing code. In some implementations, an administrator can modify the role of an application to be applied during a web protocol. In some examples, implementations of the present disclosure can also be applied to an isolated application with a single user on a single client device, enabling the single user to benefit from the protections described herein. In some examples, implementations of the present disclosure allow to integrate new web protocols to legacy applications with minor modification to its core functionality.

While generally described as computer implemented software embodied on tangible media that processes and transforms the respective data, some or all of the aspects can be computer implemented methods or further included in respective systems or other devices for performing this described functionality. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

Figure 1:
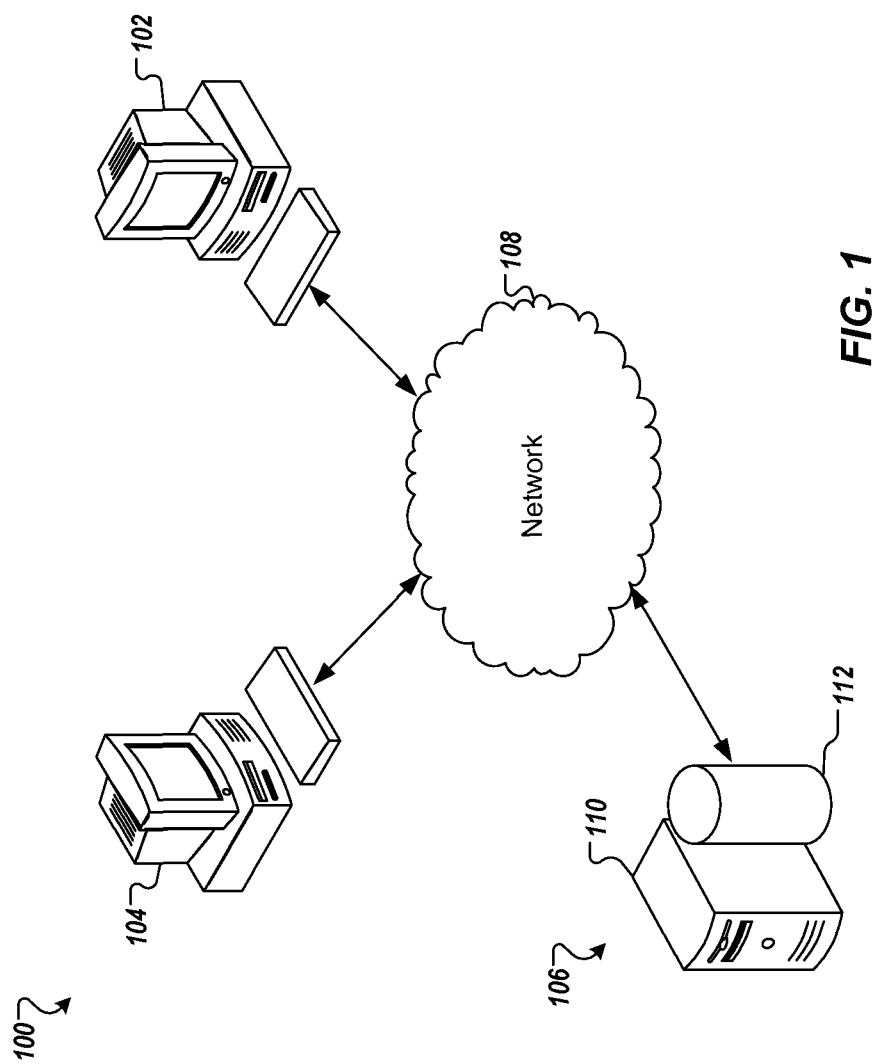
FIG. 1 depicts an example high-level architecture in accordance with implementations of the present disclosure.

This disclosure generally describes software, computer-implemented methods, and systems relating to web-based security protocols. In some examples, web-based security protocols enable authentication through multiple systems without re-entering multiple times user credentials. In some examples, web-based security protocols enable the usage of a single account at multiple service providers. In some examples, web-based security protocols enable users or systems to have limited access to resources on the web. In particular, implementations of the present disclosure are directed to carrying information from a system (e.g., web application, service, or otherwise.) to another system such that the second system can trust the information given the assurance intended by the web protocol. The information can require user input, including the user identification data, role, and/or the agreement of the user to access a proprietary resource. For example, the information can be embodied in HTTP messages.

The web protocol specification can determine the order and the content of the transmitted messages, the responsibilities and roles of the applications participating in a web protocol session, and also the security requirements for preventing the messages from being tampered with by an intruder. An example of an application role is a resource owner that holds protected assets. The application with the resource owner role can grant access to its assets. Another example of an application role is a resource server that hosts the resource owner's protected assets. Another example of an application role is a client that requires access to the protected assets of the resource owner. Another example of an application role is an authorization server that manages the authentication and authorization of different clients that required access to the protected assets of the resource owner.

In accordance with implementations of the present disclosure, interceptors (also called filters or handlers depending on the underlying technology) enable implementation of web-based security protocols. The interceptors are processing units, which provide mechanisms triggered in the processing of incoming and outgoing messages, generally prior or after the execution of the business logic. Interceptors can modify messages as required. For example, the interceptors can read and write information in the messages associated with the web protocol. Some interceptors operate on the message headers. Some interceptors operate on full message content. Interceptors allow adding parameters to the messages, to verify tokens received in messages, or even to modify the message sequence among endpoints. Interceptors are available in different technology stacks (web service framework, application server for http request handling, persistent handler, or otherwise). They provide modularity in message treatment, as one can define chains of handlers to perform specific transformations on messages.

In web application programming, a recurrent design pattern is the use of pipelines for message processing. Web application programming frameworks allow interleaving the processing components in the pipeline with interceptors (also called filters or handlers). They are objects that perform transformations on the messages, e.g., a request to a resource (servlet or static content), or on the response from a resource, or both. Interceptors can decouple functionality from the main application logic, facilitating the development of other concerns, for example authentication, logging and auditing, data compression, triggering events, among others.

Turning to the example implementation of FIG. 1, the illustrated architecture 100 includes one or more clients 102, at least some of which require access to secure data owned by the resource owner 104 and protected by the computer system 106. The client computing devices 102 and resource owner 104 can communicate with one or more of the computer systems 106 over a network 108. The computer system 106 can include one or more servers 110 and one or more data stores 112. In some implementations, the system 100 may represent a client/server system supporting multiple computer systems 106 including one or more clients (e.g., client computing devices 102 and resource owners devices 104) that are connectively coupled for communication with one another over the network 108.

The client computing devices 102 and resource owner devices 104 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The client computing devices 102 and resource owner devices 104 can access application software on one or more of the computer systems 106.

The computer system 106 can represent various forms of server systems including, but not limited to a web server, an application server, a proxy server, a network server, or a server farm. For example, one or more of the servers 110 can be an application server that executes software accessed by the client computing devices 102 and resource owner devices 104. In some implementations, the computer system 106 disposes of a configuration interface that can extend Integrated Development Environments (IDE's) to support the integration of new protocols into web or cloud applications. A user can invoke applications available on one or more of the servers 110 in a web browser running on a client (e.g., client computing device 102 and resource owner devices 104). Each application can individually access data from one or more repository resources (e.g., datastores 112). The computer system 106 can include a storage device to store information. In one implementation, the storage device is a volatile memory unit. In another implementation, the storage device is a non-volatile memory unit. The storage device is capable of providing mass storage for the system 106. In one implementation, the storage device is a computer-readable medium. In various different implementations, the storage device can be a floppy disk device, a hard disk device, an optical disk device, a tape device, or a flash memory device. The input/output device provides input/output operations for the system 106. In one implementation, the input/output device includes a keyboard and/or pointing device. In another implementation, the input/output device includes a display unit for displaying graphical user interfaces.

In some implementations, the resource owner devices 104 may communicate wirelessly through a communication interface (not shown), which may include digital signal processing circuitry where necessary. The communication interface may provide for communications under various modes or web protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such Bluetooth, WiFi, or other such transceiver communications.

The network 108 can be a large computer network, such as a local area network (LAN), wide area network (WAN), the Internet, a cellular network, or a combination thereof connecting any number of mobile clients, fixed clients, and/or servers. In some implementations, each client (e.g., client computing device 102) can communicate with one or more of the computer systems 106 via a virtual private network (VPN), Secure Shell (SSH) tunnel, or other secure network connection. The network 108 can include the Internet, a wireless service network and may include the Public Switched Telephone Network (PSTN). In other implementations, the network 108 may include a corporate network (e.g., an intranet) and one or more wireless access points.

The client computing devices 102 and resource owner devices 104 can establish their own sessions with the computer system 106. Each session can involve two-way information exchange between the computer system 106 and the client computing devices 102 and resource owner devices 104. For example, a Hypertext Transfer Protocol (HTTP) session can allow the association of information with individual users. A session can be a stateful session, in which at least one of the communicating parts (e.g., the computer systems 106 or the client computing device 102 or resource owner devices 104) stores information about the session history in order to be able to communicate. Alternatively, stateless communication during a stateless session includes independent requests with associated responses.

Each client computing device 102 and resource owner device 104 can include an application that can provide input to a computer-executed application (e.g., a web application) executed on computer system 106. As discussed in further detail herein, implementations of the present disclosure enable the input to the application to be intercepted and validated before the application is able to process the input. In some examples, if the input is validated, the application receives the input. In some examples, if the input is not validated, an error is triggered and the application does not receive the input.

In accordance with the present disclosure, the source code underlying the application can include interceptors. The interceptors can be mechanisms triggered in the processing of incoming and outgoing messages, generally prior or after the execution of the business logic. In some examples, interceptors can provide a simple mechanism for extending the application components. Furthermore, interceptors can designate runtime libraries, add parameters to the messages, verify tokens received in messages, and/or modify the message sequence among endpoints. Interceptors can be available in different technology stacks (e.g., web service framework, application server for http request handling, persistent handler, or otherwise). Interceptors can provide modularity in message treatment, defining chains of handlers to perform specific transformations on messages.

In some implementations, generic interceptors can be created. In some examples, the generic interceptors enable the implementation of a given web protocol specification. Within the context example, the protocol logic is independent from the code; enabling the creation of the protocol standard itself. The generic interceptors can be configured with application specific information. For example, the application specific information used can include the actual identity provider service address, the set of users, the web service endpoints enabled to use the protocol or other similar information. The exact configuration parameters can depend on the protocol to be put in place and on the application, which is adopting the web protocol. The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

Within the context of the present disclosure, the example system 100 can be used to integrate different security web protocols (e.g., OpenId, SAML SSO, OAuth 2) with web applications and services. For example, OAuth 2.0 web authorization protocol allows services to act on behalf of users when interacting with other services. A set of interceptors can handle the main OAuth flow using the example system 100, as previously described.

Within the context example, the system 100 can be used for securing an online banking application (as just one example). The online banking application can allow customers to share their private data via OAuth web authorization protocol in order to select an insurance company. The client credit information is held at the bank domain and is not publicly available. The bank customer has to grant the insurance company the right to access its protected information. Within the context example, the customer of the bank who is requesting a credit has the resource owner role. The protected resources are the credit information. The insurance company has the client role. The insurance company requires access to the protected resources. The bank is the OAuth resource server and the authorization server. It holds the protected resource and manages authorizations. The insurance service is implemented so that it contacts the banking service. For example, upon receipt of a request to access customer data, the insurance server acts as a client towards banking server. The insurance server creates a new HTTP request to bank server and send in turn a get request to the bank and wait for the response from bank server and act accordingly.

Figure 2:
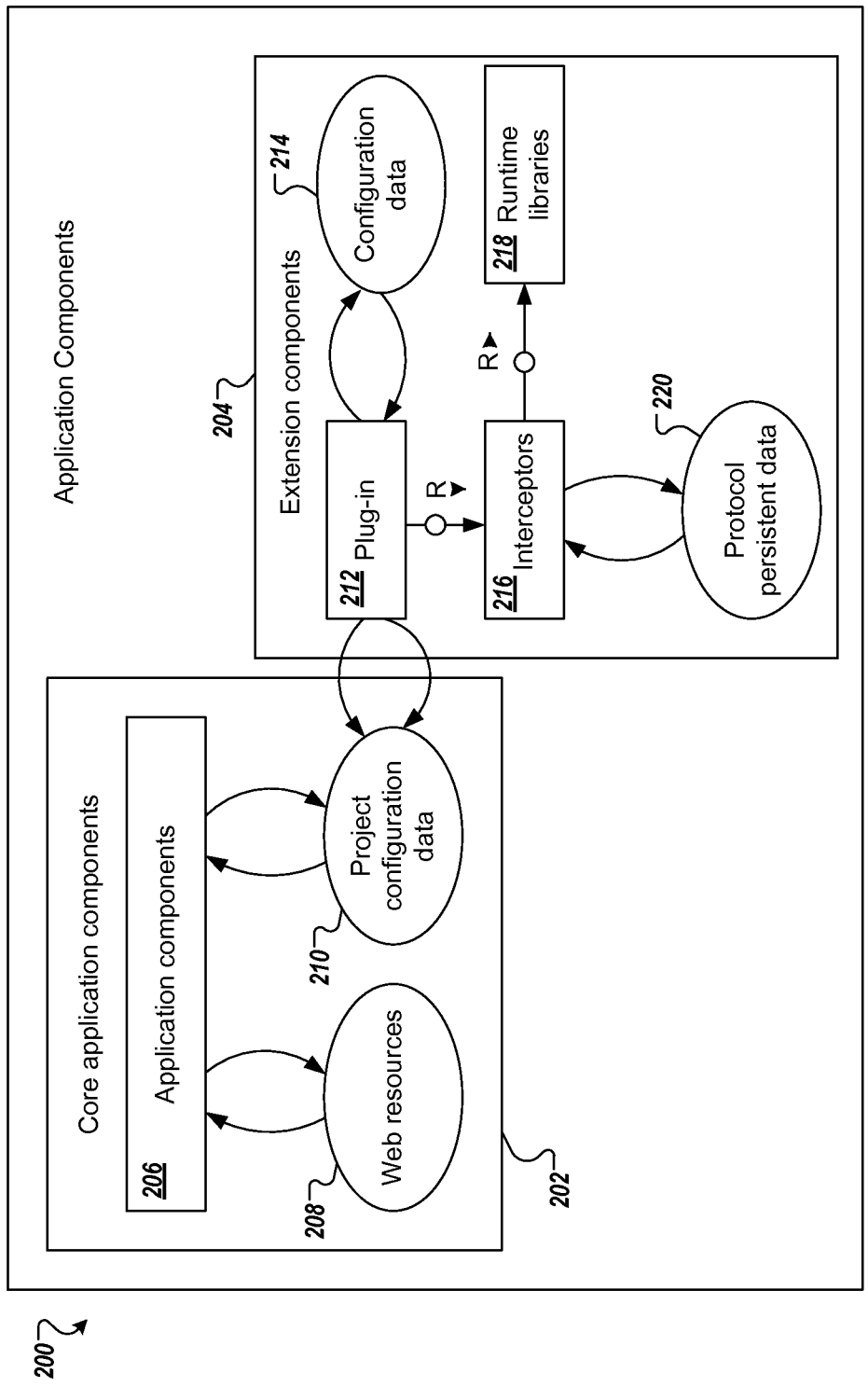
FIG. 2 depicts an example system in accordance with implementations of the present disclosure.

Referring now to FIG. 2, an example system architecture 200 that defines extended application components is discussed. The architecture 200 includes core application components 202 and extension components 204. The core application components 202 include application components 206, web resources 208 and project configuration data 210. The extension components 204 include a plug-in 212, configuration data 214, interceptors 216, runtime libraries 218 and protocol persistent data 220. Components of the system architecture 200 can be provided as one or more computer program applications that are executed using one or more processors, and/or can be provided as computer-readable memory.

In some implementations, the core application components 202 can designate any existing software components, files and databases, prior to the integration of the web protocol by the usage of the plug-in 212. The application components 206 communicate with the web resources 208 and the project configuration data 210. The project configuration data 210 can communicate with the plug-in 212, thereby connecting the core application components 202 with the extension components 204.

In some implementations, the plug-in 212 deploys a plurality of elements, extending the project architecture with the extension components. For example, the plug-in 212 communicates with the configuration data 214 and the interceptors 216. The extension components can enable the application to interact with other entities. The interaction with other entities is based on the role selected by the developer using the web protocol.

In some implementations, the plug-in 212 is a module (e.g., wizard, applet, script, or otherwise) that guides the developer during the configuration phase of the application. The plug-in 212 can guide the developer to integrate the web protocol implementation components. The plug-in 212 can be used as an add-on to the IDE where a target application is being written. The plug-in 212 can modify the project structure by the addition of further components, scripts, web pages, servlets, classes, libraries, or otherwise. In some implementations, the plug-in 212 can change the web service or web application descriptors.

In some implementations, the configuration data 214 is a repository consisting of set of files. The files can include a plain text, a structured document, an extensible markup language, an executable code or other format. The configuration data 214 can be used during design-time and/or runtime by the plug-in 212 and by the interceptors 216 in order to create an appropriate configuration to run the web protocol, in the environment of the target application.

In some implementations, the interceptors 216 include a set of handlers. The interceptors 216 can be configured according to the target application environment. The interceptors 216, communicating with the plug-in 212, can monitor and authenticate the incoming/outgoing traffic to the target application and start the execution of the web protocol, when needed to modify the message flow. In some implementations, the interceptors 216 communicate with the runtime libraries 218 and the protocol persistent data 220. The interceptors 216 can be customized through the plug-in 212. The plug-in 212 can manage the interceptors 216 during design-time and/or during runtime. For example, the plug-in 212 can manage the interceptors 216 during design-time to encode the logic of a new web protocol defining different roles of the communication parts (e.g., client and server). As another example, the plug-in 212 can manage the interceptors 216 during runtime to implement the logic using the runtime libraries 218.

In some implementations, the runtime libraries 218 include any additional software component necessary for the interceptors 216 to correctly compute the messages. The runtime libraries 218 can include, but are not limited to: encryption, token generation, access control, XML processing, or other processing. In some implementations, the runtime libraries 218 are packaged and integrated with the existing project by the plug-in 212.

In some implementations, the protocol persistent data 220 is a data store or a database (e.g., relational database, in memory database, or otherwise). The protocol persistent data 220 can store any relevant data for the web protocol. For example, the protocol persistent data 220 can include previously generated access tokens, client registration information, session information, and audit logs.

Figure 3:
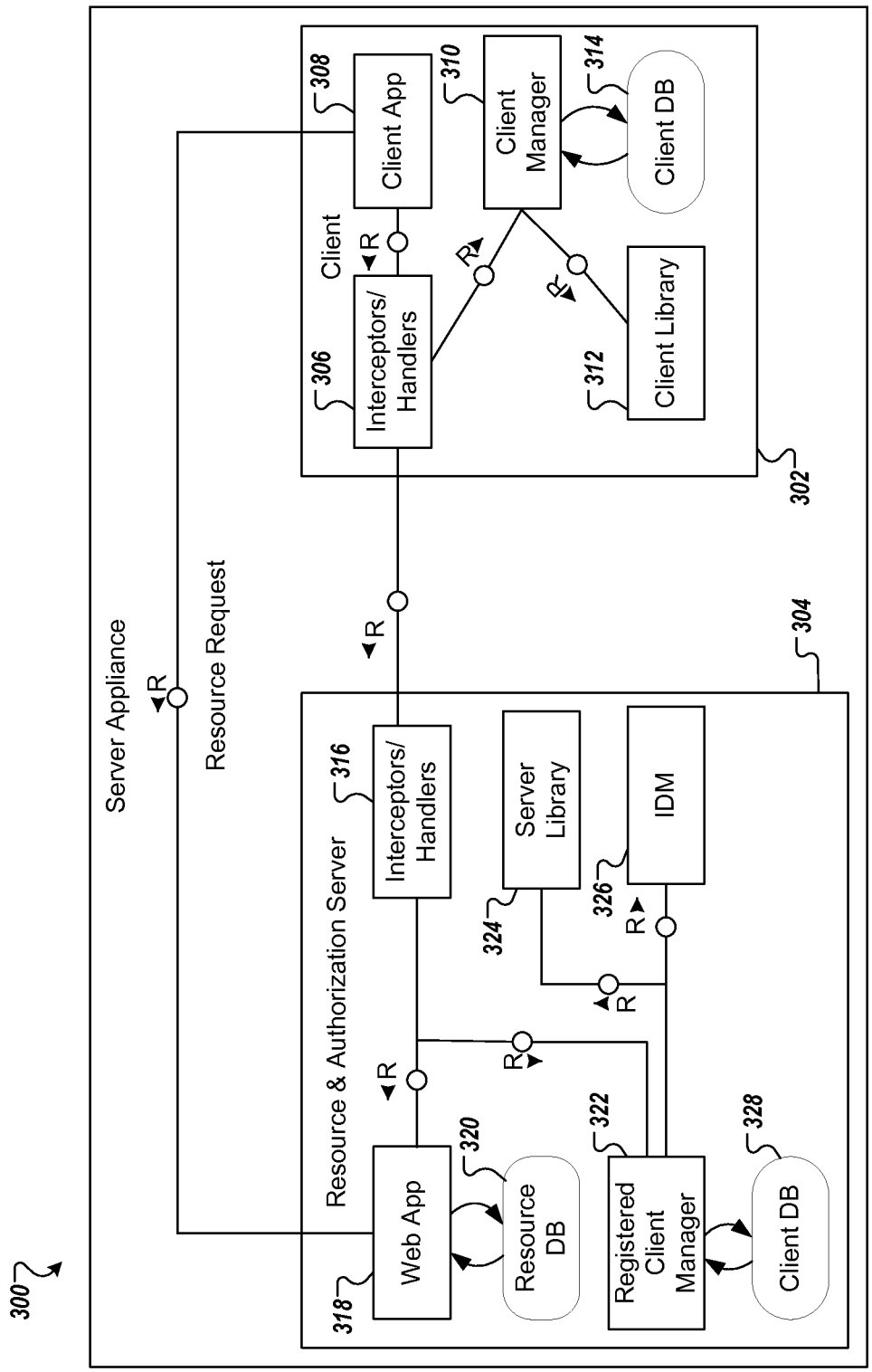
FIG. 3 depicts an example system in accordance with implementations of the present disclosure.

Referring now to FIG. 3, an example block diagram 300, defining the interceptors, is discussed. The block diagram 300 includes a client 302 and a resource and authorization server 304. The client 302 is a third party entity that requires access to protected assets on behalf of a resource owner, holding protected assets and being capable of granting access to those assets under its control. The client 302 includes interceptors 306, a client application 308, a client manager 310, a client library 312 and a client database 314.

In some implementations, the resource and authorization server 304 includes a resource server that can host the resource owner's protected assets. The resource and authorization server 304 can include an authorization server that can manage the authentication and authorization of different entities involved. In some implementations, the authorization server role is played by a trusted third party computer system. In some implementations, the client 302 interacts with the resource and authorization server 304 as with a black box (e.g., cannot distinguish between the resource server and the authorization server). For example the client 302 transmits data to and receives data from the interceptors/handlers 316.

The resource and authorization server 304 can further include a web application 318, a resource database (DB) 320, a registered client manager 322, a server library 324, an identity manager (IDM) 326 and a client database 328.

In some implementations, the attempt of the client application 308 to transmit a resource request to the web application 318 is intercepted by the interceptors 306 of the client 302. The interception of the resource request redirects the request through the interceptors 306 of the client 302 and interceptors 316 of the resource and authorization server 304. The interceptors 306 are responsible for requests modifications according to the queries of the client manager 310. The client manager 310 can handle the logic of the web protocol and validate the requests specified by the web protocol by using the client database 314 and the client library 312. The client library 312 includes, but is not limited to: encryption, token generation, access control and XML processing. Within the context example, the client library 312 can be any standard library for existing client side implementation of web protocol being deployed, provided that it is compliant with the web protocol specification.

In some implementations, the request of the client 302 is processed by the resource and authorization server 304, which can grant authorization to access the protected assets (e.g., resource database 320). The authorization can be granted by the resource owner, whose identity is checked by the Identity Manager (IDM) 326. For example, the resource owner can use the registered client manager 322, to define which client 302 can access the resource database 320. Based on the consent of the resource owner, the interceptors 306 of the client 302 receive an authorization grant. The client 302 can use the authorization grant to request access to the resource database 320. The resource and authorization server 304 may intercept the access request from the client 302, via the interceptors 316, which process the authorization grant to generate an access token. In some implementations, the access token is generated by the resource and authorization server 304, using functionality from the server library 324, on a single-use basis and is send to the client 302 via the interceptors 306. The access token can be used multiple times and it is stored by the client 302 (e.g., in the configuration data component 214 described with reference to FIG. 2). The client 302 can use the access token to access the resource database 320. In some implementations, the client 302 can access to protected assets without having access to the resource owner's credentials. In some implementations, the order in which the requests and responses are executed is defined by the client side interceptors 306 and the service side interceptors 316.

Figure 4:
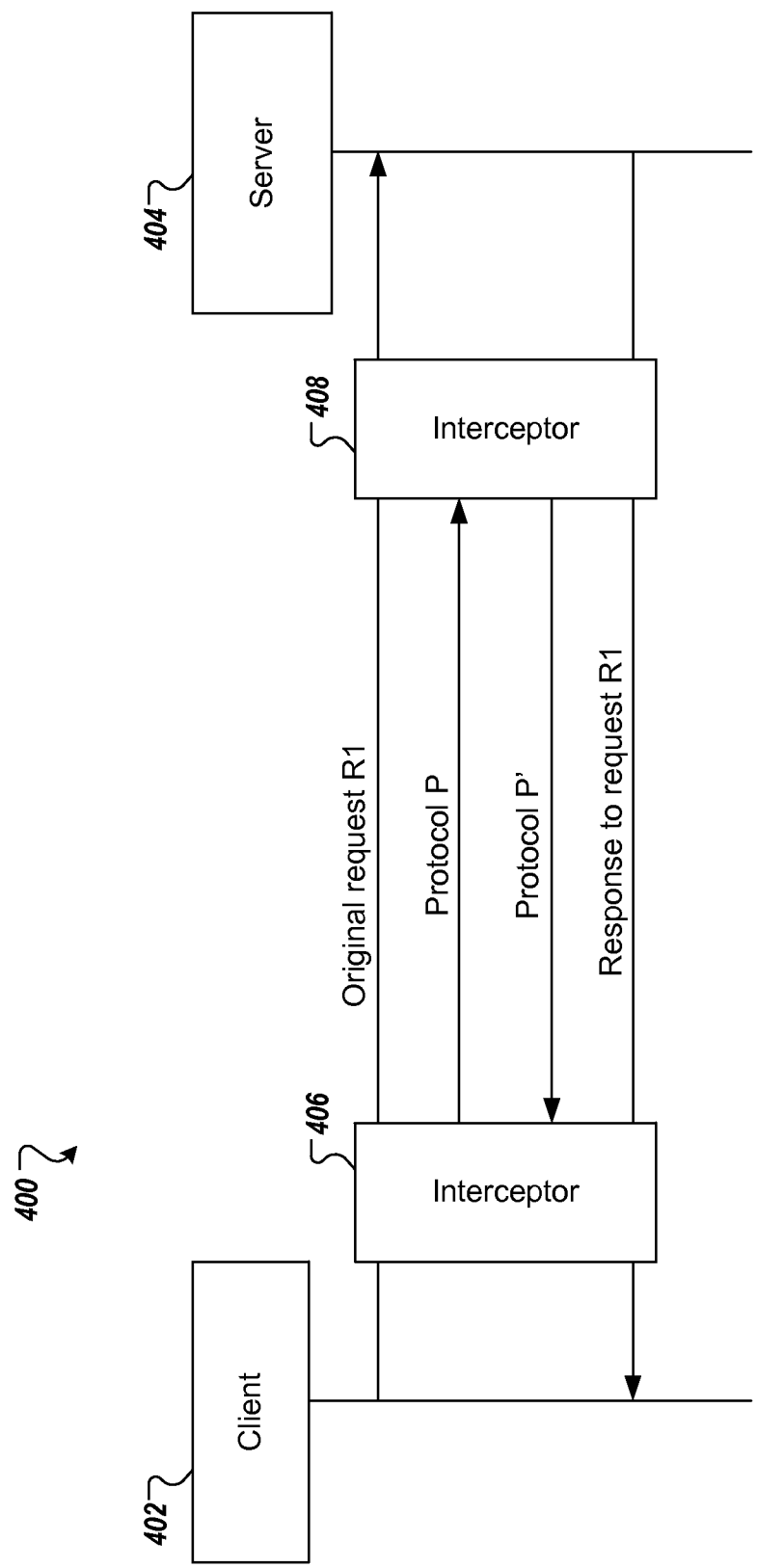
FIG. 4 depicts an example runtime protocol execution in accordance with implementations of the present disclosure.

Referring now to FIG. 4, an example runtime web protocol execution 400 is provided. The runtime web protocol execution 400 includes a client 402, a server 404, an interceptor 406 and an interceptor 408. During runtime, the client 402 can send an original request R1, which is intercepted by interceptor 406 and interceptor 408, before being received by the server 404. Upon the receipt of the original request R1, the interceptor 406 can initiate a web protocol P, consisting in a sequence of HTTP requests and responses defined in the protocol specification, which are sent to (requests) and by (responses) the interceptor 408. The interceptor 408 can initiate one or more additional data transfers (e.g., web protocol P') to and from interceptor 406, according to web protocol P specification or additional web protocols. The response to the request R1 is generated by the server 404 and send to the client 402. The response to the request R1 can be intercepted by interceptor 408 and/or interceptor 406 before being transmitted to the client 402.

In some implementations, each of the client 402 and the server 404 can be an application. The client 402 can be an identity provider and the server 404 can be a service provider. In some implementations, the client 402 can select one or multiple roles for the application to fulfill a web protocol P. At runtime, the messages from client 402 to server 404 and vice-versa are intercepted by the interceptors 406 and 408. The interceptors 406 and 408 can perform multiple operations according to the web protocol P. The operations performed by interceptors 406 and 408 can include retaining messages, adding data to messages, replaying messages, discard messages, and other similar operations.

In some implementations, either the client 402 or the server 404, performing a particular role in the web protocol P can receive or transmit messages without the interceptors 406 or 408, respectively. The bypass of the interceptors 406 or 408 is enabled in systems, which correctly implement the specification of a particular web protocol P. The use of interceptors 406 or 408 can provide increased flexibility in the incorporation of new web protocols in a given application, either the client 402 or the server 404.

In some implementations, the interceptors 406 or 408 enable standardized message exchanges and verification of security requirements according to a web protocol's specification. The interceptors 406 or 408 can handle exceptional cases. In some examples, the interceptors 406 or 408 can generate appropriate error messages in the case of malformed requests. The interceptors 406 or 408 can generate invalid messages in the case of untrusted participants, e.g. intruders. In some implementations, a web authorization protocol can allow an application (e.g., the client 402 or the server 404) to act on behalf of users when interacting with other applications. The interceptors 406 and 408, using the web authorization protocol can protect private data (e.g., username and passwords) by blocking its transfer between applications, therefore protecting users from several threats.

Figure 5:
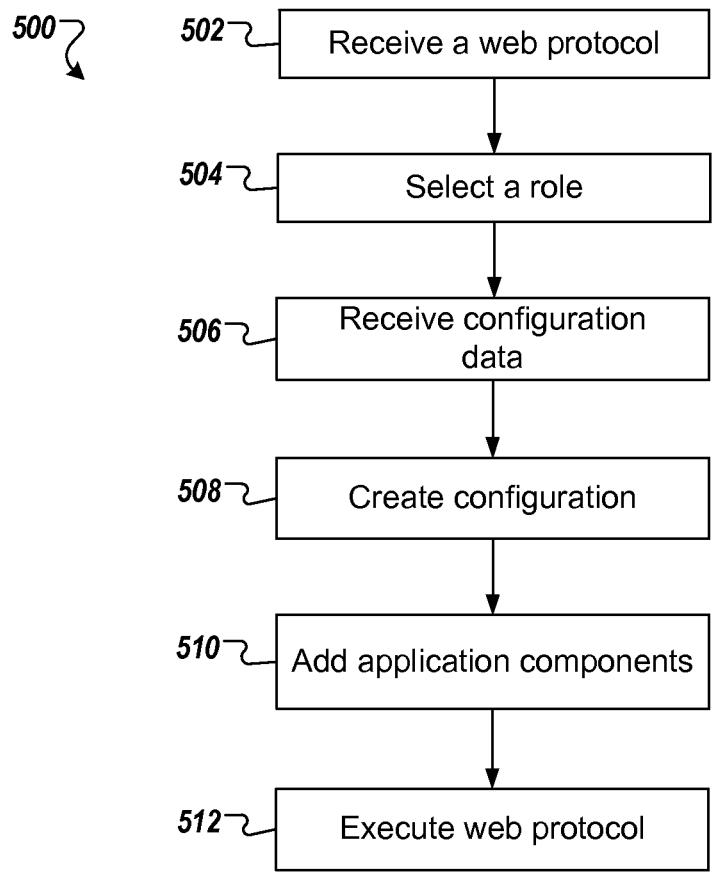
FIG. 5 depicts an example flow-chart depicting an example method that can be executed at design or compile-time in accordance with implementations of the present disclosure.

FIG. 5 is a flowchart depicting an example process 500 that can be executed during the design or compile time, to integrate the systems described with reference to FIGS. 1-4 to an existing application code. In step 502, a web protocol implementation packaged in form of interceptors, libraries and other components by a software provider in accordance with the descriptions given above is received by the plugin component 212. In some implementations, the web protocol request is received from a client computing device. In step 504, the user selects the role the application will have in have in the protocol defined in step 502. In step 506, configuration data, including a plurality of files, associated with the web protocol request is received, this includes but is not limited to resources to protect, application endpoints, registered clients, authorized users, expiration time for tokens, and any other information required by the protocol defined in step 502. In step 508, the plurality of files are used by the plugin component 212, to create a configuration and modify the application structure such that it will be able to run the web protocol, in the environment of the application. The configuration can include configuration security keys necessary for the protocol to operate correctly and endpoints in web application to which security protocol is applied. In step 510, multiple extended application components are added to the core application components using the configuration data. In some implementations, the extended application components are added to the core application components, without disrupting the core application components using the plug-in 212, as described with reference to FIG. 2. In step 512, the web protocol is executed in the application using the selected role, after the application is re-compiled or re-deployed to its execution environment.

A number of implementations of the present disclosure have been described. In addition, the logic flows depicted in the figures do not require the particular order shown, or sequential order, to achieve desirable results. In addition, other steps can be provided, or steps can be eliminated, from the described flows, and other components can be added to, or removed from, the described systems. Nevertheless, it will be understood that various modifications can be made without departing from the spirit and scope of the present disclosure. Accordingly, other implementations are within the scope of the following claims.

What is claimed is:

1. A computer-implemented method performed by one or more processors for integrating a security protocol in an application, the method comprising:
   receiving, by the one or more processors, a web protocol request generated by the application at an interceptor, the interceptor comprising a processing unit and being configured to read and write the web protocol request;
   receiving, by the one or more processors, a selection of an application role that defines a relationship between the application and protected assets, the selection of the application role comprising one or more validation aspects and a plurality of extended application components;
   based on reading the web protocol request, retrieving, by the one or more processors, configuration data associated with the web protocol request;
   adding, by the one or more processors, the plurality of extended application components using the configuration data; and
   executing, by the one or more processors, the web protocol in the application using the application role.

2. The computer-implemented method of claim 1, further comprising extracting data from a plurality of files to run the web protocol during a runtime.

3. The computer-implemented method of claim 1, wherein the configuration comprises a plurality of security keys necessary for the web protocol to operate correctly.

4. The computer-implemented method of claim 1, further comprising automatically applying the web protocol to a plurality of endpoints in a web application.

5. The computer-implemented method of claim 1, further comprising creating a configuration to run the web protocol in an environment of the application with a plurality of files of the configuration data.

6. The computer-implemented method of claim 5, wherein the plurality of files of the configuration data comprise one or more of a plain text, a structured document, an extensible markup language and an executable code.

7. The computer-implemented method of claim 1, further comprising adding the extended application components to a plurality of core application components without disrupting the plurality of core application components.

8. The computer-implemented method of claim 7, wherein a software code of the core application components is not altered.

9. The computer-implemented method of claim 7, further comprising connecting the plurality of core application components with the plurality of extended application components using a plug-in.

10. The computer-implemented method of claim 9, further comprising:
    presenting, through the plug-in, a request for input from a user during a configuration phase.

11. The computer-implemented method of claim 10, wherein the input from the user comprises a user identification data, the application role, and an agreement of the user to access a proprietary resource.

12. A non-transitory computer-readable storage medium coupled to one or more processors and having instructions stored thereon which, when executed by the one or more processors, cause the one or more processors to perform operations for integrating a security protocol in an application, the operations comprising:
    receiving a web protocol request generated by the application at an interceptor, the interceptor comprising a processing unit and being configured to read and write the web protocol request;
    receiving a selection of an application role that defines a relationship between the application and protected assets, the selection of the application role comprising one or more validation aspects and a plurality of extended application components;
    based on reading the web protocol request, retrieving configuration data associated with the web protocol request;
    adding the plurality of extended application components using the configuration data; and
    executing the web protocol in the application using the application role.

13. The non-transitory computer-readable storage medium of claim 12, wherein the operations further comprise creating a configuration to run the web protocol in an environment of the application with a plurality of files of the configuration data.

14. The non-transitory computer-readable storage medium of claim 13, wherein the plurality of files of the configuration data comprise one or more of a plain text, a structured document, an extensible markup language and an executable code.

15. The non-transitory computer-readable storage medium of claim 12, wherein the operations further comprise adding the extended application components to a plurality of core application components without disrupting the plurality of core application components and without altering a software code of the core application components.

16. The non-transitory computer-readable storage medium of claim 15, wherein the operations further comprise connecting the plurality of core application components with the plurality of extended application components using a plug-in.

17. A system of one or more computers configured to perform operations, comprising:
    receiving a web protocol request generated by an application at an interceptor, the interceptor comprising a processing unit and being configured to read and write the web protocol request;
    receiving a selection of an application role that defines a relationship between the application and protected assets, the selection of the application role comprising one or more validation aspects and a plurality of extended application components;
    based on reading the web protocol request, retrieving configuration data associated with the web protocol request;
    adding the plurality of extended application components using the configuration data; and
    executing the web protocol in the application using the application role.

18. The system of claim 17, wherein the operations further comprise adding the extended application components to a plurality of core application components without disrupting the plurality of core application components and without altering a software code of the core application components.

19. The system of claim 17, wherein the operations further comprise creating a configuration to run the web protocol in an environment of the application with a plurality of files of the configuration data.

20. The system of claim 19, wherein the plurality of files of the configuration data comprise one or more of a plain text, a structured document, an extensible markup language and an executable code.

* * * * *